US012243412B2

(12) United States Patent
Stone et al.

(10) Patent No.: US 12,243,412 B2
(45) **Date of Patent: *Mar. 4, 2025**

(54) METHODS AND APPARATUS FOR DETECTING FALSE ALARMS

(71) Applicant: Comcast Cable Communications, LLC, Philadelphia, PA (US)

(72) Inventors: Christopher Stone, Newtown, PA (US); David Yorkey, Wilmington, DE (US); Kenneth Egan, Austin, TX (US); Dustin Addison, York, PA (US); Ryan Cunningham, Haddon Heights, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,734

(22) Filed: Nov. 13, 2023

(65) Prior Publication Data

US 2024/0161601 A1 May 16, 2024

Related U.S. Application Data

(63) Continuation of application No. 17/142,078, filed on Jan. 5, 2021, now Pat. No. 11,854,372, which is a continuation of application No. 16/576,581, filed on Sep. 19, 2019, now Pat. No. 10,930,140.

(51) Int. Cl.

| | |
|---|---|
| *G08B 29/18* | (2006.01) |
| *G08B 29/16* | (2006.01) |

(52) U.S. Cl.

CPC .......... *G08B 29/185* (2013.01); *G08B 29/16* (2013.01); *G08B 29/183* (2013.01)

(58) Field of Classification Search

None

See application file for complete search history.

(56) References Cited

U.S. PATENT DOCUMENTS

| | | | | |
|---|---|---|---|---|
| 6,844,817 | B2 | 1/2005 | Gleine | |
| 10,930,140 | B1 | 2/2021 | Stone et al. | |
| 11,854,372 | B2 * | 12/2023 | Stone | G08B 29/183 |
| 2007/0279215 | A1 | 12/2007 | Tomooka et al. | |
| 2008/0001735 | A1 | 1/2008 | Tran | |
| 2012/0066707 | A1 | 3/2012 | Poder et al. | |
| 2014/0276242 | A1 | 9/2014 | Chen et al. | |

(Continued)

OTHER PUBLICATIONS

US Patent Application filed on Jan. 5, 2021, entitled "Methods and Apparatus for Detecting False Alarm", U.S. Appl. No. 17/142,078.

(Continued)

*Primary Examiner* — Thomas S McCormack

(74) *Attorney, Agent, or Firm* — BakerHostetler

(57) ABSTRACT

Methods and apparatus for detecting false alarms are disclosed. An indication may be received that a sensor device has changed state. Data indicative of movement of the sensor device may also be received. Based on the received data indicative of movement of the sensor device, it may be determined whether the movement of the sensor device is abnormal. Based on the changed state of the sensor device and based on determining that the movement of the sensor device is abnormal, an indication of a false alarm may be caused to be output.

20 Claims, 8 Drawing Sheets

(56) References Cited

U.S. PATENT DOCUMENTS

| | | | |
|---|---|---|---|
| 2015/0196231 | A1 | 7/2015 | Ziaie et al. |
| 2016/0049071 | A1 | 2/2016 | Beaver et al. |
| 2016/0189533 | A1 | 6/2016 | Modi et al. |
| 2016/0379456 | A1 | 12/2016 | Nongpiur et al. |
| 2016/0379476 | A1 | 12/2016 | Sella |
| 2017/0188895 | A1 | 7/2017 | Nathan |
| 2017/0281054 | A1 | 10/2017 | Stever et al. |
| 2018/0070889 | A1 | 3/2018 | Lee et al. |
| 2018/0165946 | A1 | 6/2018 | Poder et al. |
| 2019/0045180 | A1 | 2/2019 | Caicedo et al. |
| 2019/0355240 | A1 | 11/2019 | Razak et al. |
| 2020/0111345 | A1 | 4/2020 | Li et al. |
| 2020/0171271 | A1 | 6/2020 | Karp et al. |
| 2020/0182995 | A1 | 6/2020 | Zeng et al. |
| 2020/0187845 | A1 | 6/2020 | Nathan et al. |
| 2020/0304625 | A1 | 9/2020 | Melendez et al. |
| 2020/0342737 | A1 | 10/2020 | Pham et al. |
| 2021/0020020 | A1 | 1/2021 | Rothschild et al. |

OTHER PUBLICATIONS

US Patent Application filed on Sep. 19, 2019, entitled “Methods and Apparatus for Detecting False Alarms”, U.S. Appl. No. 16/576,581.

* cited by examiner

800

METHODS AND APPARATUS FOR DETECTING FALSE ALARMS

CROSS-REFERENCE TO RELATED APPLICATIONS

This application is a continuation of U.S. patent application Ser. No. 17/142,078, filed Jan. 5, 2021, now U.S. Pat. No. 11,854,372, issued Dec. 26, 2023, which is a continuation application of U.S. patent application Ser. No. 16/576,581, filed Sep. 19, 2019, now U.S. Pat. No. 10,930,140, issued Feb. 23, 2021, which are hereby incorporated by reference in their entirety.

BACKGROUND

Premises management systems, such as residential alarm systems, may be configured such that false alarms may be triggered by minor physical changes in a premises, such as a door or window sensor falling off its mounting. False alarms may cause a service provider or a user of the premises nuisance or expense. Additionally, false alarms may undesirably consume processing capacity and memory resources of devices associated with the premises management system.

SUMMARY

Methods and apparatus for detecting false alarms are disclosed. A plurality of premises devices of a premises management system may be monitored. The premises devices may comprise one or more sensor devices, such as a door sensor, a window sensor, a light sensor, a motion sensor, or the like. Other premises devices may comprise monitoring devices, such as a camera, an acoustic device, or the like. An indication may be received that a sensor device has changed state. The change in state may be caused by a detection or triggering of a potential alarm or security event by the sensor device, such as a contact sensor of a sensor device changing from a closed position to an open position. Data indicative of movement of the sensor device may also be received. The data indicative of movement may comprise data of an accelerometer of the sensor device, data of a gyroscope of the sensor device, an image or video captured by a camera associated with the sensor device, or other data indicative of movement of the sensor device. Based on the received data indicative of movement of the sensor device, it may be determined whether the movement of the sensor device is abnormal. Determining whether the movement of the sensor device is abnormal may comprise comparing the received data to data indicative of normal movement of the sensor device. The data indicative of normal movement of the sensor device may comprise data indicative of historical movement of the sensor device, data stored as part of a calibration of the sensor device, data input by a user of the sensor device, preprogrammed data associated with the sensor device, or other data. Based on the changed state of the sensor device and based on determining that the movement of the sensor device is abnormal, an indication of a false alarm may be caused to be output. One or more other sensor or monitoring devices may be caused to enter a heightened security state or level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
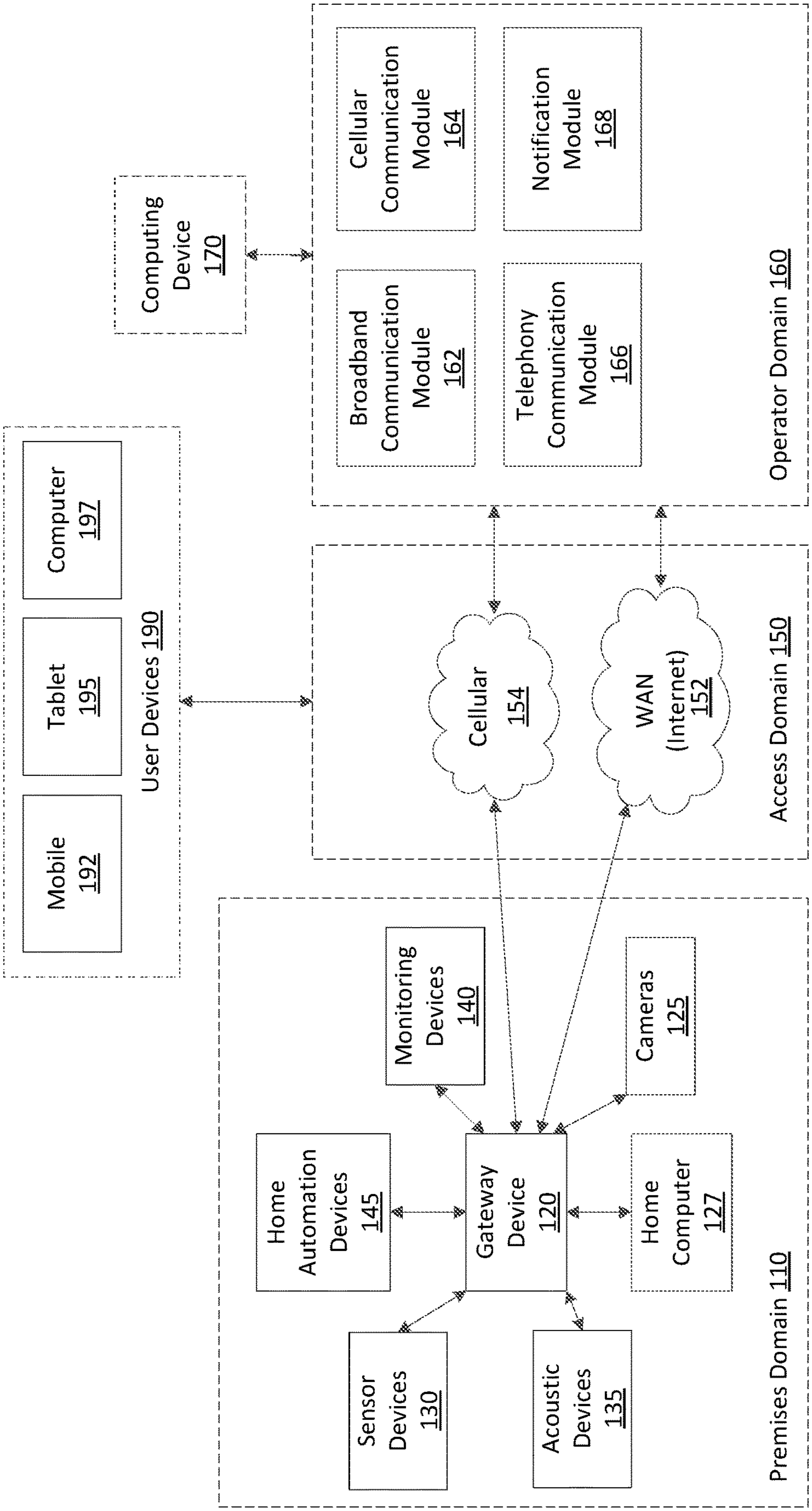
FIG. 1 shows an example premises management system network.

A premises may comprise a premises management system that may monitor the premises and detect security events at the premises, such as a break-in(s) or an attempted break-in(s) at the premises. The premises management system may comprise one or more premises device, such as one or more sensor devices associated with one or more passageways (e.g., doorway, window opening, hallway, gateway, etc.) or one or more passageway closures (e.g., door, window, gate, etc.) of the premises. A sensor device may comprise a door or window sensor that senses a position (e.g., open or closed) of the door or window, a motion sensor, such as a passive infrared sensor (PIR), for detecting motion, a glass breakage sensor, or other sensor device. Some sensor devices, such as a door or window sensor or a motion sensor, may comprise a wireless communications device, such as a Radio Frequency (RF) device, and/or one or more measuring devices, such as an accelerometer, a gyroscopes, or other device for measuring movement or orientation, as examples. Other premises devices may comprise monitoring devices, such as a camera or an acoustic device, such as a microphone, or the like.

As a respective passageway closure moves during normal operation, the one or more measuring devices of a sensor device used to monitor that closure may capture measurements associated with the normal operation of the closure. For example, an accelerometer or gyroscope of the sensor device may be used to capture measurements associated with normal operation. The sensor device may register data indicative of normal operation of the sensor device by sending the measurements captured during the normal operation (e.g., via the wireless communications device) to a computing device associated with the premises management system. One or more other sensor devices or monitoring devices, such as a camera, a microphone, a motion detector, or other door or window sensor associated with the premises management system may be used to further monitor a particular sensor or an area associated with the sensor device during the normal operation of the passageway closure monitored by the sensor device.

The premises management system may determine that a sensor device is compromised and may indicate that it is in a trouble state. The premises management system may determine that the sensor is compromised by determining whether the sensor device has moved in an abnormal manner. Determining whether the sensor device has moved in an abnormal manner may be determined by analyzing data indicative of movement of the sensor device, such as measurements captured by the one or more measuring devices of the sensor device. The analyzing may comprise comparing a captured measurement from one of the one or more measuring devices to measurements or data indicative of normal operation or movement of the sensor device. For example, if an accelerometer or a gyroscope of a door-mounted door sensor measures a sudden vertical downward movement of the door sensor (e.g., along a z-axis), the system may determine that the sensor may have fallen from its mount on the door or window.

If the premises management system is in an armed state, and a sensor device is determined to be compromised based on detected abnormal movement, the premises management system may set the compromised sensor to a trouble state, notify a user associated with the premises management system of a false alarm, and cause other sensor or monitoring devices associated with the compromised sensor device to enter a heightened security state or level. Causing other sensor or monitoring devices to enter a heightened security state or level may comprise, for example, focusing or zooming a camera on the compromised sensor or area adjacent the sensor or increasing a sensitivity of a microphone or a motion sensor in the vicinity of, or otherwise associated with, the compromised sensor.

Determining whether a false alarm occurred may in addition comprise analyzing other data associated with the sensor device, such as data from another sensor or monitoring device associated with the sensor device. For example, a microphone in the vicinity of the sensor device may detect normal background noise (indicating nothing is amiss) or may detect sound similar to that of a sensor device falling from its mount to the floor (indicating a compromised sensor). As another example, video data from a camera may show a sensor device that is supposed to be mounted on a door lying instead on the floor in front of the door. The video data may further show that the door is still closed. Similarly, data from such other sensors or monitors may be used to confirm that a security event has occurred. For example, data from the microphone may reveal unknown voices, the video data from a camera may show a breached passageway closure, or a temperature reading from a temperature sensor may reveal a sudden change in pressure or temperature indicative of a sudden rush of outside air into the premises. In an instance in which the premises management system determines that a false alarm did not occur, the premises management system may cause output of an alarm.

Some sensors device, such as door or window sensors, may be configured such that movement of the monitored door or window of more than an inch may trigger an alarm event. However, depending on how the sensor is installed and how far away a magnet is placed to the sensor, something as simple as a foundation associated with the premises shifting or a loose door or window may cause a false alarm. To minimize false alarms, some alarm systems use wide-gap contacts for door and/or window sensors. For example, such systems may provide additional sensor movement tolerance, such as increasing the usual one-inch movement tolerance to an inch and a half or two inches, in order to reduce false alarms. However, wide-gap sensors may still trigger false alarms in many instances.

Traditional alarm systems typically are unable to detect that a sensor device has become dislodged from its mounting and, for example, has fallen to the floor, resulting in a malfunction of the sensor device as opposed to a real security/alarm event. Therefore, there exists a need for methods and apparatus for preventing false alarms in such instances. Preventing false alarms may also conserve processing capacity and memory resources of communication devices.

FIG. 1 shows an example premises management system network. The example premises management system network may comprise and/or be in communication with a premises domain 110, an access domain 150, an operator domain 160, a computing device 170, and one or more user devices 190.

The premises domain 110 may comprise a gateway device 120. The premises domain 110 may be in communication with the access domain 150. The premises domain 110 may be in communication with the operator domain 160 via the access domain 150. The operator domain 160 may comprise and/or be in communication with one or more computing devices, such as the computing device 170, which may comprises a network device, such as a server, or other computing device.

The premises domain 110 may comprise a collection of security, monitoring and automation entities within a dwelling or other location, including one or more premises devices of the premises management system.

The gateway device 120 may be a device that provides an interface to the various entities (e.g., cameras 125, sensor devices 130, acoustic devices 135, monitoring devices 140, home automation devices 145, home computer 127, etc.) within the premises domain 110. The gateway device 120 may be configured to act as a gateway interface between the premises domain 110 and the operator domain 160.

Premises devices within the premises domain 110 may comprise a variety of sensor devices 130 whose signals are received and interpreted by the gateway device 120. The sensor devices 130 may comprise door sensors, window sensors, door/window sensors, motion detectors, smoke detectors, glass break detectors, inertial detectors, water detectors, carbon dioxide detectors, light sensors, light switches, thermostats, key fob devices, and the like. The gateway device 120 may be configured to react to a change in a state of any of the sensor devices 130. The gateway device 120 may be configured to determine when a sensor device (e.g., door sensor, window sensor, etc.) changes from a closed state to an open state. The gateway device 120 may be configured to determine whether the sensor device has moved in an abnormal manner, such as by falling off its normal mounting to a door, window, or other object associated with the door or window at a premises.

The gateway device 120 may be configured to act and/or react based on detecting a state change of one of the one or more sensor devices 130. Acting and/or reacting may comprise sounding an audio alert, outputting a visual alert to a user interface and/or generating an electronic notification upon detecting a state change. In addition to acting and reacting to changes in a state of the one or more sensor devices 130, the gateway device 120 also may be coupled to one or more acoustic devices 135. The one or more acoustic devices 135 may be configured to listen for noise/sound at the premises and record the noise/sound. The one or more acoustic devices 135 may be configured to provide audio data associated with the recorded noise/sound to the gateway device 120. The gateway device 120 may be configured to provide alarm or sensor state information to a computing device 170 in the operator domain 160 that may ultimately cause the computing device 170 to take appropriate action. As discussed more fully below, the gateway device 120 may be configured to perform a variety of actions in response to a change of state in any premises device.

The gateway device 120 may be coupled to one or more monitoring devices 140. The one or more monitoring devices 140 may comprise video cameras that capture images and/or videos, as well as associated audio, that are viewable on a display of the gateway device 120 (e.g., via a user interface of a display of the gateway device 120) and/or one or more remotely connected user devices 190 (e.g., mobile device 192, tablet 195 (also referred to herein as smart tablet 195), or computer 197). The one or more monitoring devices 140 may be coupled to the gateway device 120 wirelessly (e.g., WiFi, etc.) or via other connections.

Home automation devices 145 (e.g., home area network devices having an automation interface) may be coupled to and/or controlled by the gateway device 120. The gateway device 120 may be configured to interact with a variety of home automation protocols, such as Z-Wave and ZigBee.

The gateway device 120 may be configured to communicate with a variety of sensor device and is not limited to communication with the sensors 130, monitoring devices 140, and home automation devices 145 described above. The methods and apparatus described herein are not limited to, or by, the above-described devices and sensors, and may be applied to other areas and devices.

The gateway device 120 may be used to configure and/or control the premises devices, including sensor devices 130, acoustic devices 135, monitoring devices 140, and/or automation devices 145, such as directly as a gateway or remotely controlled by the computing device 170 in the operator domain 160. The gateway device 120 may be configured to communicate with the computing device 170 residing in the operator domain 160 (e.g., located external to the premises) via networks (e.g., cellular network 154, wide area network (WAN) 152) in the access domain 150. Broadband communication can be provided by coupling the gateway device 120 with the wide area network 152, such as a provider network or the Internet. The wide area network 152 may be coupled to the computing device 170 in the operator domain 160, such as via a router and/or firewall (not shown). The gateway device 120 may comprise additional mechanisms to provide communication with the operator domain 160. The gateway device 120 may be configured with a cellular network transceiver that permits communication with the cellular network 154. The cellular network 154 may provide access to the computing device 170 in the operator domain 160. The gateway device 120 may not be limited to providing gateway functionality via cellular and dwelling-based routers and modems. The gateway device 120 may be configured with other network protocol controllers, such as a controller configured for Worldwide Interoperability for Microwave Access (WiMAX) satellite-based broadband, a controller configured for direct telephone coupling, or the like.

The operator domain 160 may be configured to configure, manage, and/or control premises devices (e.g., sensor devices 130, home automation devices 145, monitoring devices 140, acoustic devices 135, etc.) within the premises domain 110. The operator domain 160 may be maintained by a provider or operator of subscriber-based services. Examples of providers may include cable providers, telecommunications providers, and the like.

The operator domain 160 may comprise one or more computing devices 170. A computing device 170 may be configured to support all non-alarm and alarm events, heartbeats, and commands of traffic between the gateway device 120. Computing device 170 may be configured to manage end-user electronic notifications (e.g., electronic mail) and/or short message service (SMS) notification.

The computing device 170 may be configured to process and send information related to alarm events received from one or more gateway devices 120 to communication devices of other entities, such as the user devices 190, and/or devices of emergency agencies, such as a police department, a fire department, etc.

A computing device 170 in the operator domain 160 may be configured to provide a variety of functionalities. Logically, a computing device 170 may comprise the following functional modules: a broadband communication module 162, a cellular communication module 164, a notification module 168, and/or a telephony communication module 166.

The broadband communication module 162 may be configured to manage broadband connections and message traffic from a plurality of gateway devices 120 coupled to the computing device 170. A broadband channel may be utilized as a communication channel between a gateway device 120 and broadband the communication module 162. The broadband communication module 162 may be configured to handle a variety of communications. The variety of communications may comprise non-alarm and alarm events, broadband heartbeats, commands of traffic between the broadband communication module 162 and the gateway device 120 over the broadband channel, etc. If a user of a user device (e.g., mobile device 192, smart tablet 195, computer 197) has a subscriber portal active and a zone is tripped within the premises domain 110, a zone fault may be reflected in near real-time on the subscriber portal user interface.

The cellular communication module 164 may be configured to manage cellular connections and message traffic from gateway devices 120 to the computing device 170. A cellular channel may be utilized as a backup communication channel to the broadband channel. If a broadband channel becomes unavailable, communication between a gateway device 120 and the computing device 170 may switch to the cellular channel. At this time, the cellular communication module 164 may be configured to handle non-alarm and alarm events and commands of traffic from a gateway device 120. When a broadband channel is active, heartbeat messages may be sent periodically on the cellular channel in order to monitor the cellular channel.

A notification module 168 of the computing device 170 may be configured to determine if and how a user should be notified of events generated by a gateway device 120 associated with the user. The user may specify a device to notify and/or a method of notification of particular events or event types and how to notify the user (e.g., telephone call, electronic mail, text message, and the like), and the user specified notification information may be stored by the computing device. When events such as alarm or non-alarm events are received by the broadband communication module 162, the events may be provided asynchronously to the notification module 168, which may be configured to determine whether to send a notification, where to send a notification, and how to send a notification based upon the notification information associated with the user.

The telephony communication module 166 may be configured to facilitate communication between the computing device 170 and a gateway device 120. When the computing device 170 receives and performs an initial processing of alarm events, the telephony communication module 166 may be configured to send the alarm events to applicable communication devices (e.g., mobile device 192, smart tablet 195, computer 197, etc.).

A user may arm a premises management system related to a premises when the user leaves the premises. The premises may comprise a front door. The premises management system may comprise a first door sensor associated with the front door and a gateway device. The first door sensor may be mounted on or otherwise secured to the front door. The first door sensor may comprise a gyroscope, an accelerometer, and a wireless communications device. The wireless communications device may comprise an RF communications device. The gateway device 170 may comprise a wireless communications device, such as an RF device.

Sometime after the user has armed the premises management system and left the premises, the premises management system may detect a change in state of the first door sensor. For example, the gyroscope may capture orientation data associated with the first door sensor. The accelerometer may capture acceleration data associated with the first door sensor. The wireless communications device of the first door sensor may send the orientation data and/or the acceleration data to another device in any of the domains 110, 150, 160, such as to a computing device, such as computing device 170 for example. The wireless communications device of the first door sensor may send the data to the other device via the gateway device 120.

The gateway device 120 may send the orientation data and the acceleration data across a network, such as the cellular network 154 or the Internet 152, to a computing device associated with an operator of the premises management system, such as the computing device 170. The computing device may determine that the orientation data and/or the acceleration data indicates the first sensor has moved in an abnormal manner, such as by falling from its mount on the front door, as opposed to the front door being kicked in (e.g., the orientation data and the acceleration data may be consistent with a free fall, etc.).

The computing device 170 may send a command across the network to the gateway device. The command may cause the gateway device to cause a camera associated with the front door to scan an area associated with the front door. For example, the command may cause the gateway device to cause a camera associated with the front door to scan a floor in front of the front door. The command may cause the gateway device to cause a microphone associated with the front door to increase sensitivity. The command may cause the gateway device to cause a light sensor associated with the premises to capture light data, such as light data associated with detected light of an area outside of a structure associated with the premises and/or light data associated with detected light of an area inside the structure. The command may cause the gateway device to cause a camera associated with a front yard to track any detected movement in the front yard.

Data collected by the sensor devices 130, monitoring devices 140, cameras 125, and acoustic devices 135 may be sent to the gateway device 120. The gateway device 120 may send the data received from these devices and sensors across the network 152/154 to the computing device 170. In one example, the computing device may determine from data received from the gyroscope or the accelerometer of the first door sensor that the first door sensor has fallen from its mounting. The computing device may determine from the data that this movement represents a false alarm as opposed to an alarm or security event. The computing device may alert the user of the premises management system that the first door sensor has malfunctioned and/or is in a trouble state. The determination that the first door sensor is in a trouble state may also be based on data received from other sensor devices or monitoring devices at the premises.

For example, the computing device 170 may determine from video data from a camera at the premises that the front door is in the closed position. The computing device 170 may determine from the video data from the camera that the first door sensor is on the floor. The computing device 170 may determine from a glass breakage sensor that a sound of breaking glass was not detected. The computing device 170 may determine a time of day based on outside light data from a light sensor. The computing device 170 may determine there is no detected movement by a motion detector located in the front yard of the premises. The computing device 170 may compare all or some of this data received from the gateway device 120 with historical data for the premises and determine that there is no unusual sound or movement detected for the premises for the time of day. Based on the collected data and associated analysis, the computing device 170 may determine that the change of state of the first door sensor is a false alarm. Alternatively, the sensor device itself may determine that its movement is abnormal and may determine that its change of state represents a false alarm.

The computing device 170 may cause an electronic message to be sent to a user device (e.g., a user device 190) associated with the user. The message may comprise a notification of a trouble state associated with the first door sensor. The trouble state may denote that an alarm is not triggered based on the change of state of the first door sensor.

Figure 2:
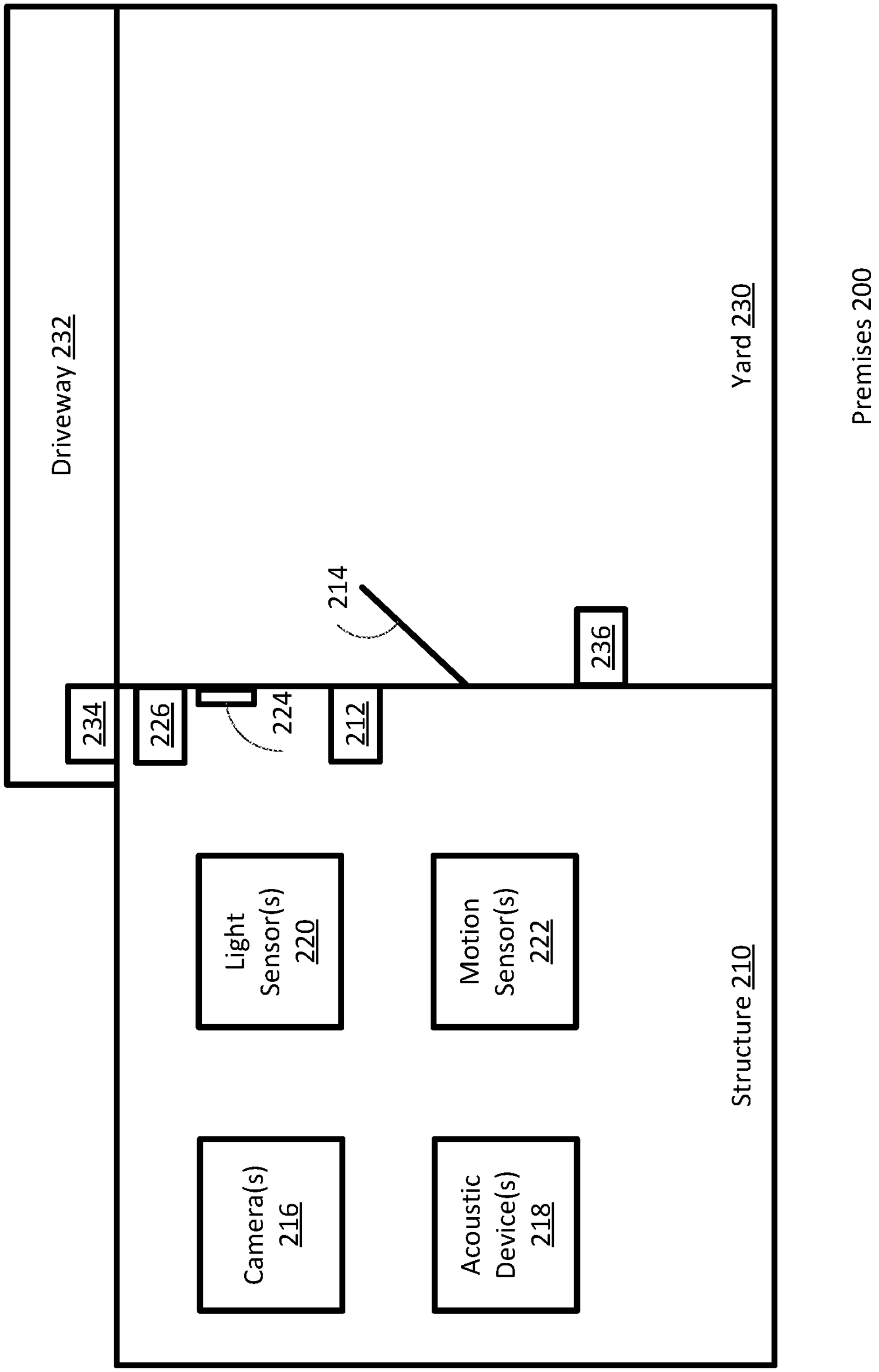
FIG. 2 shows an example premises management system at a premises.

FIG. 2 shows an example premises management system at a premises 200. The premises 200 may comprise a structure 210 (e.g., a home, an office, a warehouse, etc.) and a yard 230. An interior portion of the structure 210 may comprise one or more interior camera(s) 216, one or more acoustic device(s) 218, one or more light sensor(s) 220, and/or one or more motion sensor(s) 222 (e.g., a PIR sensor, etc.). The yard 230 may comprise a driveway 232. An exterior portion of the structure 210 may comprise a first exterior camera 234 configured to capture image and/or video data associated with the driveway 232 and a second exterior camera 236 configured to capture image data and/or video data associated with the yard 230. The structure 210 may comprise a doorway with an exterior door 214 that may be opened or closed. The structure 210 may also comprise a window 224 that may be opened or closed. The structure may also comprises one or more sensor devices. For example, a door sensor 212 associated with the exterior door 214 may detect whether the door is opened or closed. A window sensor 226 associated with the window 224 may detect whether the window is opened or closed.

In a closed position, an interior portion of the exterior door 214 may define a portion of the structure 210, such as a room. When the exterior door 214 is open, the doorway provides a passageway between the room and the yard 230. The door sensor 212 and/or window sensor 226 may be described in more detail in reference to the sensor 310 in FIG. 3. The one or more acoustic device(s) 218 may comprise one or more acoustic recording device(s), microphone(s), or other audio detecting devices.

In the event of a detection of a problem with the door sensor 212 and/or the window sensor 226, such as a determination that the sensor device moved in an abnormal manner, one or more actions may be taken. The one or more actions may comprise setting one or more of the camera(s) 216, acoustic device(s) 218, light sensor(s) 220, motion sensor(s) 222, first exterior camera 234, and or exterior camera 236, in the vicinity of the door 214 or window 224, to a heightened security state or level.

When the one or more camera(s) 216 are set to a heightened security state or level, the one or more camera(s) 216 may be woken from a sleep state. When the one or more camera(s) 216 are set to a heightened security state or level, the one or more camera(s) 216 may be focus on and/or zoomed to an area associated with the exterior door 214 and/or window 224 and/or an area of a floor near the exterior door 214 or window 224. When the one or more acoustic device(s) 218 are set to a heightened security state or level, the one or more acoustic device(s) 218 may be woken from a sleep state. In an instance in which the one or more acoustic device(s) 218 are set to a heightened security state or level, a sensitivity associated with the one or more acoustic device(s) 218 may be increased. The increased sensitivity may cause the acoustic device(s) to capture/record noise/sound associated with the structure. Further, in an instance in which the one or more light sensor(s) 220 are set to a heightened security state or level, the one or more light sensor(s) 220 may be woken from a sleep state. When the one or more light sensor(s) 220 are set to a heightened security state or level, the one or more light sensor(s) 220 may record light data indicative of a time of day. In an instance in which the one or more motion sensor(s) 222 are set to a heightened security state or level, the one or more motion sensor(s) 222 may be woken from a sleep state. In this regard when the one or more motion sensor(s) 222 are set to a heightened security state or level, the one or more motion sensor(s) 222 may be set to a state in which a sensitivity level of the one or more motion sensor(s) 222 is increased to detect more movement(s) relative to a prior mode of the sensor(s) 222.

When the first exterior camera 234 is set to a heightened security state or level, the first exterior camera 234 may be woken from a sleep state. In an instance in which the first exterior camera 234 is set to a heightened security state or level, the first exterior camera 234 may focus on and/or zoom to the driveway 232. When the second exterior camera 236 is set to a heightened security state or level, the second exterior camera 236 may be woken from a sleep state. In this regard when the second exterior camera 236 is set to a heightened security state or level, the second exterior camera 236 may focus on and/or zoom to the yard 230.

In an example, a user may arm a premises management system related to a premises. The premises (e.g., premises 200) may comprise a kitchen and a living room as well as other rooms. The kitchen may comprise a front door. The premises management system may comprise a camera (e.g., camera 216) associated with the living room, a camera associated with the kitchen, an acoustic device (e.g., acoustic device 218) associated with the living room, an acoustic device associated with the kitchen, a light sensor (e.g., light sensor 220) associated with the living room, a light sensor associated with the kitchen, a motion sensor (e.g., motion sensor 222) associated with the living room, a motion sensor associated with the kitchen, a first door sensor (door sensor 212) associated with the front door (exterior door 214), and a gateway device (e.g., gateway device 120). The first door sensor may be secured to the front door. The first door sensor may comprise a gyroscope, an accelerometer, and/or a wireless communications device. The gateway device may comprise a wireless communications device.

The premises management system may detect a change in state of the first door sensor. For example, the premises management system may detect that a contact sensor of the first door sensor has moved from a closed state to an open state (which may normally be associated with opening of door). The gyroscope may capture orientation data associated with the first door sensor. The accelerometer may capture acceleration data associated with the first door sensor. The wireless communications device of the first door sensor may send the orientation data and the acceleration data to the wireless communications device of the gateway device.

The gateway device may determine that the orientation data and the acceleration data indicate the first door sensor has moved in an abnormal manner. For example, the data may indicate that the door sensor has fallen off the front door, as opposed to the front door being opened in an unauthorized manner, such as being kicked-in or knocked down (e.g., the orientation data and the acceleration data may be consistent with a free fall in a vertical direction). The gateway device may determine that has moved in an abnormal manner, for example, by determining that the orientation data and/or the acceleration data exceeds a threshold value (s) associated with normal movement of the sensor device. In some examples, the gateway device may send the orientation data and the acceleration data across a network (e.g., wide area network 152) to a computing device (e.g., computing device 170) associated with an operator of the premises management system. The computing device may determine that the orientation data and the acceleration data indicate the first door sensor has moved in an abnormal manner. In other examples, the sensor device itself may determine from the orientation data and/or the acceleration data that it has moved in an abnormal manner.

Based on determining that the first door sensor has moved in an abnormal manner, the gateway device (e.g., gateway device 120) or another computing device (e.g., computing device 170) may cause or trigger a camera (e.g., camera(s) 216) associated with the kitchen to scan an area of the front door to determine a location of the sensor device and may also cause the camera to determine whether the front door is in a closed position. For example, the gateway device may cause the camera to scan a floor in front of the front door. A motion sensor (e.g., motion sensor 222) associated with the living room may be caused to scan the room for movement and/or track any detected movement. A microphone (e.g., acoustic device(s) 218) associated with the kitchen may be caused to increase sensitivity. A microphone associated with the living room may be caused to wake from a sleep state and to increase sensitivity. For example, sensitivity of the microphone(s) may be increased to detect sound/noise that is above a predetermined threshold (e.g., 50 decibels (dBA) (e.g., Noise Criterion (NC)-35 based on the American National Standards Institute/Acoustical Society of America (ANSI/ASA) S12.2-2008)). An exterior camera associated with a front yard may be caused to capture/record an image(s)/video(s) of any detected movement in the front yard. An exterior camera associated with a driveway may be caused to capture an image(s)/video(s) of the driveway.

Data captured by the sensor devices and monitoring devices of the premises management system may be provided to the gateway device. The gateway device may determine that the front door is in the closed position based on analyzing the data captured by the sensors. In this regard, for example, the gateway device may determine that the first door sensor is on the floor and the front door is in the closed position and is not on the floor. The gateway device may determine there is no detected movement in the front yard of the premises. The gateway device may also determine there is no detected vehicle (other than a vehicle(s) of a user associated with the premises) and/or person in the driveway of the premises. The gateway device may compare the captured data received from the sensor and monitoring devices with historical data associated with the premises and determine that there is no unusual sound or movement detected within or outside of the premises for the time of day.

The gateway device may determine that the change in state of the door sensor represents a false alarm based, in part, on determining that the movement of the first door sensor was abnormal, such as being the result of falling from its mounting on the door. The gateway device may cause an electronic notification message to be sent to a user device (e.g., a user device 190) of a user associated with the premises (e.g., premises 200). The electronic notification/message may indicate that the first door sensor is in a trouble state and/or that a false alarm has occurred. The gateway device may not generate an alarm event since there is no security breach associated with the change in state of the sensor device.

In some examples, the gateway device may send the data captured/collected by the sensor and monitoring devices across the network (e.g., wide area network 152) to the computing device. The computing device (e.g., computing device 170) may perform the steps described above. In other examples, the door sensor device itself may perform the described actions.

Figure 3:
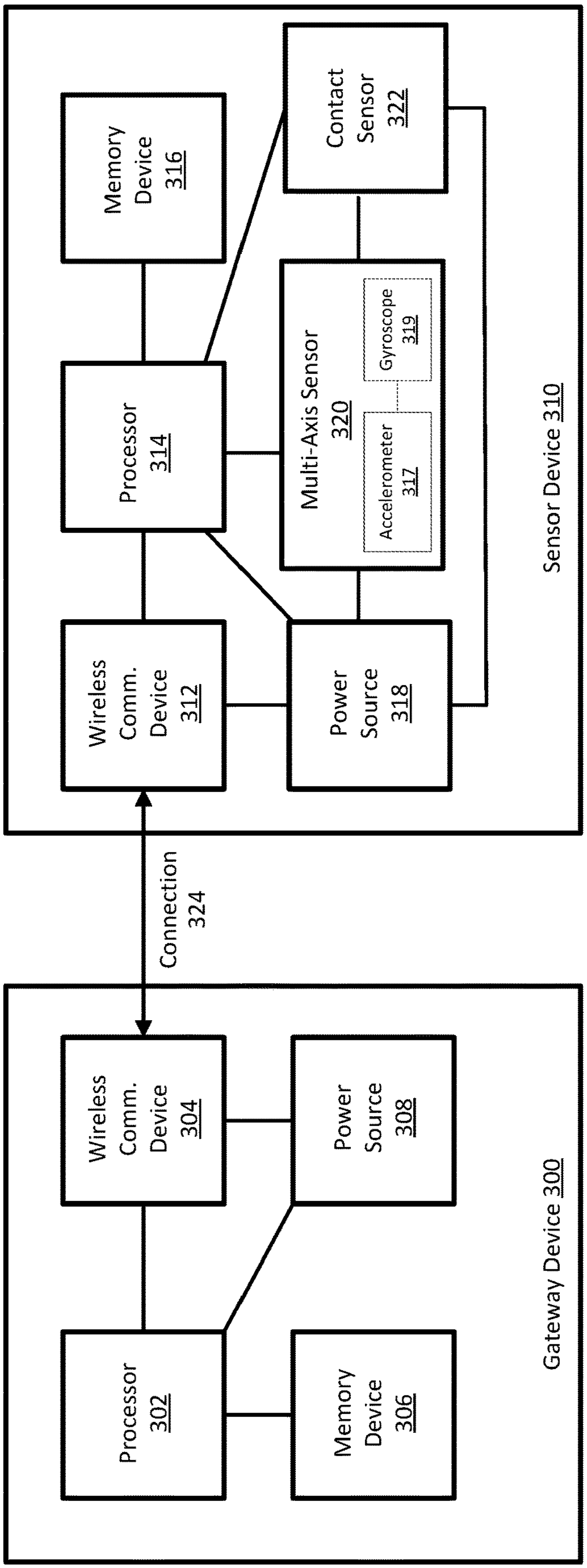
FIG. 3 shows an example premises management system.

FIG. 3 shows another example premises management system. The example premises management system may comprise a gateway device 300 (e.g., gateway 120) and a sensor device 310 (e.g., door sensor 212, window sensor 226). The sensor device 310 may be installed as a door/window open/close monitoring device.

The sensor device 310 may comprise a wireless communications device 312. The wireless communications device 312 may comprise an RF radio. The gateway device 300 may comprise a wireless communications device 304. The wireless communications device 304 may comprise an RF radio. The sensor device 310 may communicate with the gateway device 300 via connection 324. The connection 324 may be a wireless connection, such as an RF connection. The connection 324 may function in accordance with a wireless communications protocol such as, for example, Zigbee, Z-Wave, Wi-Fi or numerous other wireless protocols.

The gateway device 300 may comprise a power source 308. The power source 308 may comprise a power supply. The power source 308 may comprise an alternating-current (AC) power supply. In another example, the power source 308 may comprise a direct current (DC) power supply. In another example, the power source 308 may comprise an AC-DC power supply. The power source 308 may provide power to the wireless communications device 304 and/or a processor 302.

The sensor device 310 may comprise a power source 318. The power source 318 may comprise a battery. The power source 318 may provide power to the wireless communications device 312, a processor 314, a multi-axis sensor 320 such as, for example, a magnetometer, a Micro Electro-Mechanical System (MEMS) accelerometer, a MEMS gyroscope or any other suitable device that detects multi-axis movement, and/or a contact sensor 322. The multi-axis sensor 320 may also comprise one or more of an accelerometer 317, a gyroscope 319, and the like and may be packaged as a MEMS sensor. The contact sensor 322 may comprise a hall sensor.

The gateway device 300 may comprise the processor 302. The processor 302 may be in communication with a memory device 306, the wireless communications device 304, and/or the power source 308. The processor 302 may send information to and/or receive information from the memory device 306, the wireless communications device 304, and/or the power source 308.

The sensor device 310 may comprise the processor 314. The processor 314 may be in communication with the wireless communications device 312, the power source 318, the multi-axis sensor 320, the contact sensor 322, and/or a memory device 316. The processor 314 may send information to and/or receive information from the wireless communications device 312, the power source 318, the multi-axis sensor 320, the contact sensor 322, and/or the memory device 316.

Figure 4:
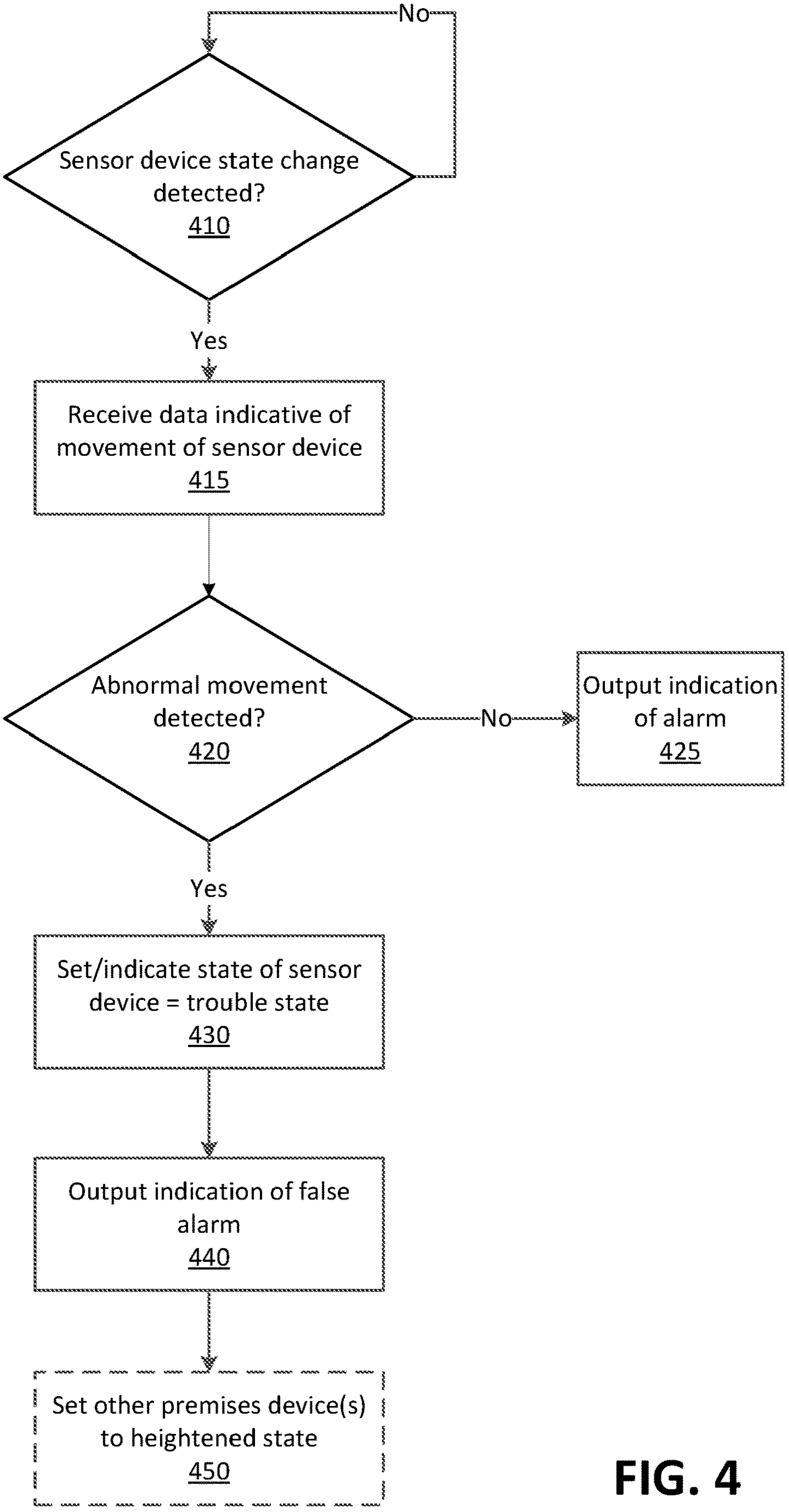
FIG. 4 shows an example method.
Figure 5:
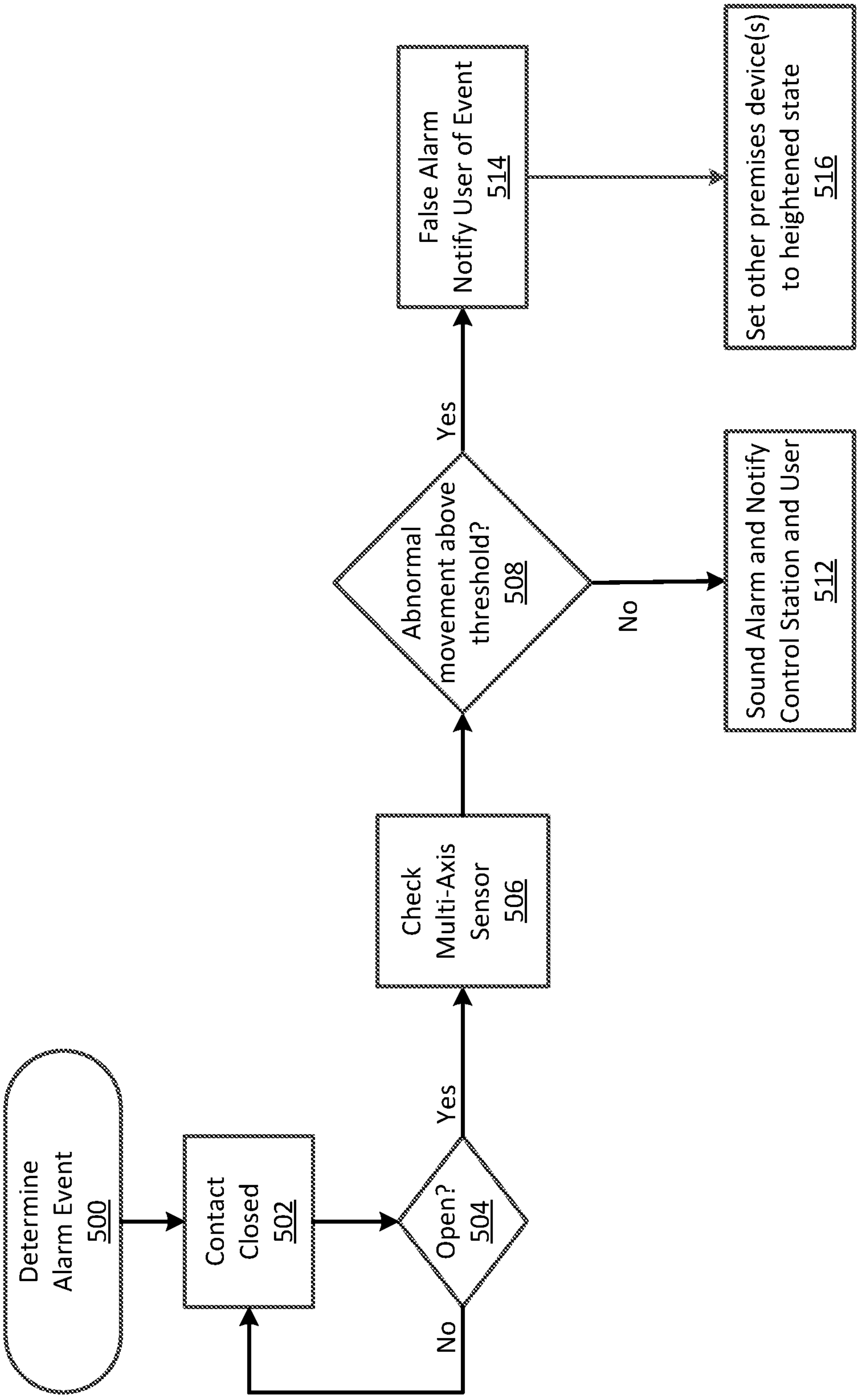
FIG. 5 shows an example method.
Figure 7:
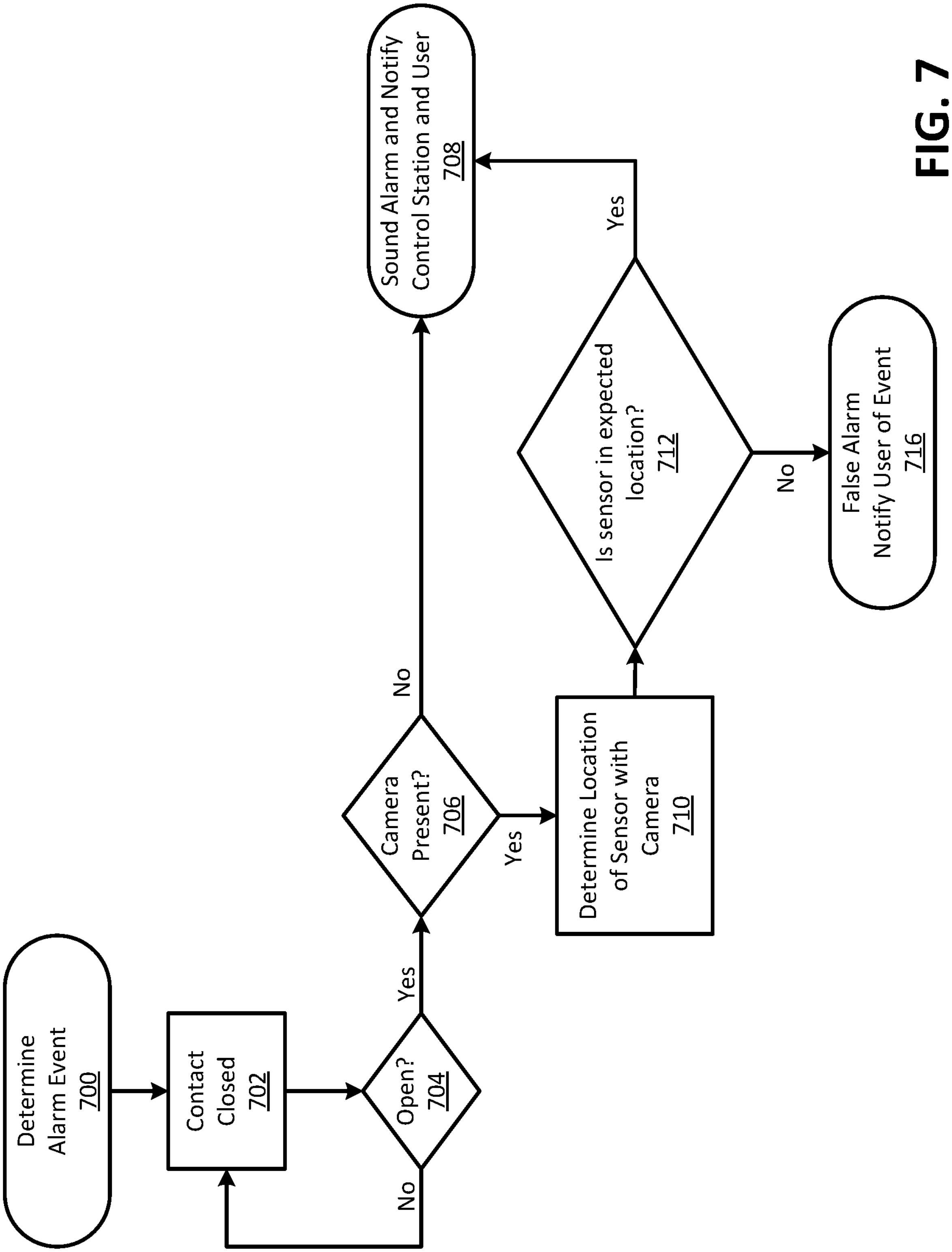
FIG. 7 shows an example method.

The memory device 306 may store instructions that, when executed by the processor 302, facilitate performance of the methods described in reference to FIGS. 4, 5, and 7. The memory device 316 may store instructions that, when executed by the processor 314, facilitate performance of the methods described in reference to FIGS. 4, 5, and 7.

The processor 314 may receive information from the gateway device 300, wherein the received information may indicate that the sensor device 310 is configured as a door/window sensor. When the contact sensor 322 detects a state change from a closed to open position, the contact sensor 322 may notify the processor 314. Upon notification from the contact sensor 322 that there is a state change, the processor 314 may execute one of the methods described in FIG. 4, 5, or 7 to determine whether there is an alarm even or a false alarm.

The processor 314 may receive accelerometer information from the multi-axis sensor 320. When the sensor device 310 is configured as a door/window sensor, an accelerometer 317 of the multi-axis sensor 320 may detect movement of the sensor device 310 in an X, Y and/or Z plane. In an instance in which the accelerometer 317 detects abnormal movement in one of the planes, the processor 314 may determine that the sensor device 310 moved in a manner that is abnormal (also referred to herein as uncommon) to the sensor device 310. For example, in normal operation, a door sensor mounted to a door may move in only an X or Y plane. If the accelerometer 317 detects movement in a Z plane, the processor 314 may determine that the sensor device 310 moved in an abnormal manner.

An abnormal movement of the sensor device 310 may, for example, result from the sensor device 310 falling off of an area (e.g., a wall, a hinge, a window sill etc.) associated with a door or window. The processor 314 associated with the sensor device 310 may send data indicative of movement of the sensor device 310. The gateway device 300 may determine that the sensor device 310 moved in an abnormal manner. Further, upon receipt of the data from the processor 314, the gateway device 300 may cause/trigger other devices (e.g., camera(s) 216, light sensor(s) 220, acoustic device(s) 218, motion sensor(s) 222) to determine/verify whether the abnormal movement represents a false alarm.

FIG. 4 shows an example method. At step 410, an apparatus, such as gateway device 120, gateway device 300, computing device 170, or a sensor device itself (e.g., sensors 130, 212, 226, or 310) may communicate with a plurality of premises devices of a premises management system located at a premises. The premises devices may comprise one or more sensor devices (e.g., sensor devices 130, 310), such as a door sensor (e.g., door sensor 212), a window sensor (e.g., window sensor 226), a light sensor(s) 220, or a motion sensor(s) 222, or other monitoring devices, such as a camera (s) 216, or an acoustic device(s) 218. The apparatus may continue to monitor the premises devices for any changes in state of any of the premises devices. If no changes in the state of any premises devices are detect, the apparatus may continue monitoring.

At step 410, the apparatus may receive an indication that a sensor device has changed state. The change in state may be caused by any detection or triggering of a potential alarm or security event by the sensor device, such as a contact sensor of the sensor device changing from a closed position to an open position, a light sensor detecting light, a motion detector detecting motion, or any other detection or triggering event associated with the particular type of sensor device. For example, the apparatus may receive a signal from a door sensor indicating that the sensor contact has opened. The apparatus may determine from the received signal that a potential alarm event has occurred, such a break-in or other unauthorized intrusion. If at step 410, a change of state of a sensor device of the premises devices is detected, control may pass to step 415.

At step 415, the apparatus may receive data indicative of movement of the sensor device. The apparatus may send a message to the sensor device requesting such data. The sensor device may send the data to the apparatus upon a change of state of the sensor device. The received data may comprise one or more of data of an accelerometer of the sensor device or data of a gyroscope of the sensor device, such as accelerometer data from the accelerometer 317 or gyroscopic data from the gyroscope 319 of the sensor device 310. Alternatively, or in addition, the received data may comprise an image and/or video captured by a camera associated with sensor device, such as a camera located in the vicinity of the sensor device, such as camera 600 for example.

At step 420, the apparatus may determine, based on the data, whether the movement of the sensor device is abnormal. Determining whether the movement of the sensor device is abnormal may comprise comparing the received data to data indicative of normal movement of the sensor device. The data indicative of normal movement of the sensor device may comprise data indicative of historical movement of the sensor device, data stored as part of a calibration of the sensor device, data input by a user of the sensor device, or preprogrammed data associated with the sensor device. In the case where the data indicative of movement of the sensor device comprises accelerometer data and/or gyroscopic date, determining whether the movement of the sensor device is abnormal may comprise determining whether a speed of movement or acceleration of the sensor device exceeds a threshold value or determining whether the sensor device has moved in a direction on with respect to a plane that is abnormal. In a case in which the data indicative of movement of the sensor device comprises an image or video captured by a camera associated with sensor device, determining whether the movement of the sensor device is abnormal may comprise determining, based on the image or video, that a location of the sensor device has changed. For example, analysis of the image or video may show that a door sensor which normally is positioned on a door is now positioned on a floor in front of the door.

A determination that the sensor device has moved in an abnormal manner may be based on detecting movement of the sensor device in an X, Y and/or Z plane. Movement of the sensor device may be detected by an accelerometer or gyroscope of the sensor device. In an instance in which the accelerometer detects an unusual change in movement in one of the planes, it may be determined that the sensor device moved in a manner that is abnormal or uncommon to the sensor device. For example, in normal operation, a door sensor mounted to a door may move in only an X or Y plane. If the accelerometer detects movement in a Z plane, it may be determined that the sensor device moved in an abnormal manner.

As another example, the apparatus or the sensor device itself may determine that the sensor device moved in an abnormal manner based on a speed of movement of the sensor device. For example, the apparatus may receive an indication of the speed of movement of the sensor device from an accelerometer of the sensor device. In an instance in which the apparatus or the sensor device itself determines that the speed of movement of the sensor device exceeds a predetermined speed threshold, the apparatus or sensor device may determine that the sensor device has moved in an abnormal manner, such as being dislodged from an area on which it was mounted.

The apparatus or the sensor device itself may receive a plurality of gyroscope values and accelerometer values detected by the sensor device. In some examples, the received gyroscope values and accelerometer values may be detected by the sensor device during a predetermined time period.

The apparatus or the sensor device itself may determine that at least one of the gyroscope values or accelerometer values indicate an abnormal movement of the sensor device. The at least one gyroscope value or the at least one accelerometer value may be defined as a threshold value. It may be determined from any abnormal movement of the sensor device that the sensor device has been dislodged from an the area on which it was mounted, such as a door and/or a window.

The apparatus may determine that the sensor device moved in an abnormal manner based on a detected radio frequency (RF) value of the sensor device exceeding an RF power value (e.g., an average RF power value (e.g., −50 decibel milliwatts (dBm))) of the sensor device by a predetermined threshold (e.g., +/−10 dBm, +/−12 dBm, etc.). For purposes of illustration and not of limitation, as an example, the apparatus may learn or detect that an average received power associated with a Received Signal Strength Indicator (RSSI) over time for an RF sensor is −50 dBm and may set/establish −50 dBm as the average RF power value. In this regard, in an instance in which the apparatus detects received RF power (e.g., −60 dBm) associated with the sensor device and determines that the received RF power exceeds a predetermined threshold (e.g., +/−10 dBm), the apparatus may determine that a physical state of the sensor device changed (e.g., the sensor device fell). Additionally or alternatively, in some embodiments, the apparatus may determine that the sensor device moved in an abnormal manner based on historical data indicating a RF value (e.g., a historical RF value) of the sensor device exceeds an RF power value, such as an average RF power value (e.g., −50 dBm), of the sensor device by a predetermined threshold (e.g., +/−10 dBm, +/−12 dBm, etc.). For example, the apparatus may determine that the sensor device moved in an abnormal manner based on determining that the historical RF value (e.g., −60 dBm) of the sensor device, at a time of day (e.g., 3:00 PM), exceeded the average RF power value (e.g., −50 dBm) by the predetermined threshold (e.g., +/−10 dBm, +/−12 dBm, etc.).

In some other examples, the apparatus may determine the predetermined threshold above the average RF power value by evaluating one or more received RF values of the sensor device over a predetermined time period and determining that a subset of the RF values equaling or exceeding the predetermined threshold comprise abnormal values indicative of unauthorized force at the area associated with the sensor device. The area associated with the sensor device may comprise at least one of a hinge, a wall or other component of a structure (e.g., a home, an office, a warehouse, etc.) within a predetermined proximity to the sensor device.

As described above, the data indicative of movement of the sensor device may comprise at least one of an image(s) and/or a video(s) of the sensor device from at least one camera device (e.g., camera device 500) of the premises devices. The apparatus may determine a location of the sensor device based on the image(s) and/or the video(s). For example, the apparatus may determine whether the sensor device is dislodged (e.g., fallen or otherwise moved) from an area in which, or on which, it is normally mounted, such as an area associated with a door or a window. The determination whether the sensor device is dislodged from the area may be based on the location of the sensor device determined from the image(s) and/or the video(s). Dislodging may comprise, for example, the sensor device falling off an area associated with a door or a window.

The apparatus may determine whether the sensor device moved abnormally by determining whether the location, as determined from the image(s) and/or video(s), is a normal location (e.g., first location 510) of the sensor device. The normal location of the sensor device may comprise a location within a predetermined proximity of the area in which the sensor device is normally mounted. The apparatus may determine that the sensor device has moved abnormally based on determining that the location of the sensor device comprises an abnormal location (e.g., second location 508). The abnormal location may comprise a location that is a distance outside the predetermined proximity of the area at or on which the sensor device is normally mounted, such as an area associated with a door or a window. The abnormal location may comprise a location other than the normal location. The abnormal location may comprise a location on a floor or ground associated with a door or a window.

If at step 420, any movement of the sensor device indicated by the received data is determined to be normal movement of the sensor device, then control may pass to step 425. At step 425, the apparatus may cause output of an indication of an alarm. The apparatus may send notification of the indication of the alarm to one or more computing devices located external to the premises and configured to monitor the premises management system and/or one or more devices of emergency agencies. The emergency agencies may comprise one or more of a police department or a fire department, etc. The indication of the alarm may comprise an audible alert, a visual alert presented via a user interface, or an electronic notification indicating a security event associated with the sensor device. The security event may comprise unauthorized access, or an attempted unauthorized access, by at least one intruder. The security event may comprise damage to an area associated with a door or the window by at least one intruder. The damage may comprise a break-in or kick-in of the door or the window.

If at step 420, any movement of the sensor device indicated by the received data is determined to be abnormal, then control may pass to step 430. At step 430, a state of the sensor device may be set to, or otherwise caused to be indicated as, a trouble state. The indication of the state of the sensor device may be recorded in a database or other memory of the apparatus or of another device, such as the sensor device itself. The trouble state may be indicative of a failure condition associated with the sensor device. For example, if the movement of the sensor device is indicative of the sensor device falling from an area on which it is normally mounted, such as a door or window, that failure condition may be indicated by setting the state of the sensor device to the trouble state.

At step 440, the apparatus may cause output of an indication of a false alarm. Output of an indication of a false alarm may comprise generation of an electronic notification sent to a user device (e.g., a user device 190). The electronic notification may indicate that the sensor device is in a trouble state and/or that an alarm event has not occurred.

At step 450, the apparatus may cause one or more other sensor or monitoring devices of the premises devices to be set to, or otherwise activated in, a heightened state or level of security. For example, one or more of the premises devices (e.g., camera(s) 216, light sensor(s) 220, acoustic device(s) 218, motion sensor(s) 222) may be caused to enter a higher security level to focus on an area associated with the sensor device based on the output of the false alarm. The higher security level may comprise a level of security higher than a prior level of security of the one or more premises devices in an instance in which an alarm system of the premises management system is armed.

For example, one or more acoustic devices (e.g., acoustic device(s) 218) of the premises devices in an area associated with the sensor device may be caused to enter an active state to listen for sound or noise that may exceed a predetermined threshold. Alternatively, or in addition, the acoustic device (s) may be caused to listen for sounds indicating a glass break or damage to the premises, such as damage to a door or a window. Alternatively, or in addition, the acoustic device(s) may be caused to listen for sounds indicating that the sensor device may have become dislodged from its mounting, such as a sound indicating a sensor device has fallen from a mount on a door or window onto a floor of the premises. The apparatus may determine whether the audio data indicates a glass break or a fall of the sensor device by determining whether the audio data matches or corresponds to prerecorded or predefined audio of such events. The prerecorded or predefined audio content may be generated by recording one or more test drops of a sensor device from a height associated with a door or window to a floor or ground or test breaks of glass associated with the door or the window. The floor may comprise at least one of a tile floor, a wood floor, a concrete floor, or other flooring material. The acoustic devices may enter the active state by waking up from a dormant state to the active state.

In some examples, the apparatus may cause output of the indication of the false alarm based at least in part on determining that the audio data captured by the one or more acoustic devices is similar to the prerecorded or predefined audio of the fall of a sensor device to a floor or the ground. The apparatus may cause output of an indication of an alarm based at least in part on determining that the audio data captured by the one or more acoustic devices is similar to the prerecorded or predefined audio of a glass break. In some instances, the apparatus may cause output of an indication of an alarm based on determining that sound of the audio data captured by the one or more acoustic devices exceeds a threshold and is indicative of a break-in, such as the kicking-in or knocking-down of a door or window. The threshold may comprise a predetermined decibel level.

In addition or alternatively, one or more cameras of the premises devices may be caused to reposition to focus on the area associated with the sensor device. Analysis of an image(s) and/or video(s) from the repositioned camera may be used to confirm the false alarm. For example, it may be determined from the image(s) and/or video(s) of a repositioned camera(s) that the sensor device is in its normal location and/or that the area monitored by the sensor device, such as a door or window, is not damaged.

Alternatively, or in addition, a camera outside, or external to, a structure associated with the sensor device, such as a door or window), may be adjusted to record movement in a yard (e.g., yard 230) or driveway (e.g., 232) associated with the structure and/or to detect and/or record movement of one or more entities (e.g., individuals) in the area.

The apparatus may receive light sensor data from one or more light sensors (e.g., light sensor(s) 220) of the premises devices. The light sensor data may be used to determine or confirm a time of day. For example, during the day time, the light sensor may detect sunlight and its light sensor data may be used to confirm that it is day time. The light sensor data may also be used to detect abnormal activity. For example, if an intruder enters a premises at 3:00 am using a flashlight, the light sensor data may detect the light from the flashlight and the apparatus may determine that detection of light at that time is abnormal.

The apparatus may determine whether the sensor device (e.g., sensor device 310) is in a trouble state based in part on the time of day that light is detected by a light sensor and/or whether the time of detection is within a predetermined time period of the day.

The predetermined time period may be defined by analyzing historical light sensor data. The historical light sensor data may be received from the light sensor(s) over time. The historical light sensor data may be analyzed to determine a time period that a user associated with the structure (e.g., structure 210) is historically awake and is within the structure. The predetermined time period may comprise, for example, a time period between 5:00 PM to 10:00 PM. The predetermined time period may comprise a time period comprising any other suitable time period.

The apparatus may cause output of the indication of the alarm based at least in part on determining that a time of day at which light is detected by a light sensor is outside of the predetermined time period. The apparatus may cause output of the indication of the false alarm based at least in part on determining that a time of day at which light is detected by a light sensor is within the predetermined time period.

As described above, the apparatus may receive one or more images and/or video captured by a camera(s) device (e.g., camera(s) 216, camera device 500). The apparatus may detect whether near field communication (NFC) is available with a user device (e.g., a user device 190) of the user to determine whether the user is within the structure (e.g., structure 210) during the time of day. A camera(s) device (e.g., exterior camera 234) may also be positioned to capture one or more images and/or video(s) of a driveway (e.g., driveway 232) associated with the structure (e.g., structure 210).

The apparatus may determine that the user is absent from the structure during the time of day in response to determining that the NFC communication with the user device is unavailable or that the one or more images and/or the video(s) indicate that one or more vehicles associated with the user is absent from the driveway. The NFC communication may comprise, for example, a Bluetooth communication or any other suitable short-range communication.

Additionally, the apparatus may determine that the user is absent from the structure (e.g., structure 210) during the time of day by analyzing calendar data associated with the user device of the user and detecting that the calendar data indicates the user is not at the structure during the time of day. The calendar may indicate, for example, that the user is at work during the time of day.

As an example, a user may arm a premises management system related to a premises. The premises (e.g., premises 200) may comprise a kitchen and a living room. The kitchen may comprise a front door. The premises management system may comprise a camera (e.g., camera(s) 216) associated with the living room, a camera associated with the kitchen, an acoustic device (e.g., acoustic device(s) 218) associated with the living room, an acoustic device associated with the kitchen, a light sensor (e.g., light sensor(s) 220) associated with the living room, a light sensor associated with the kitchen, a motion sensor (e.g., motion sensor(s) 222) associated with the living room, a motion sensor associated with the kitchen, a first door sensor (e.g., door sensor 212) associated with the front door (e.g., exterior door 214), and a gateway device (e.g., gateway device 300). The first door sensor may be secured to the front door. The first door sensor may comprise a gyroscope (e.g., gyroscope 319), an accelerometer (e.g., accelerometer 317), and a wireless communications device (e.g., wireless communications device 312). The gateway device may comprise a wireless communications device (e.g., wireless communications device 304).

The gateway device may detect a state change in the first door sensor. The gyroscope may capture orientation data (e.g., one or more orientation values) associated with the first door sensor. The accelerometer may capture acceleration data (e.g., one or more accelerometer values) associated with the first door sensor. The wireless communications device of the first door sensor may send the orientation data and the acceleration data to the gateway device. The gateway device may determine that the orientation data and the acceleration data indicate the first sensor has fallen off an area associated with the front door, as opposed to the front door being kicked-in or knocked-down. In this regard, the orientation data and/or the acceleration data may denote, for example, that the door sensor has fallen from its mount on the door.

The gateway device may set the door sensor to a trouble state and may send a user device of a user of the premises a notification that the door sensor is in a trouble state and that an alarm event has not occurred. The notification may also denote that there is a false alarm associated with the door sensor. The gateway device may cause the other devices of the premises management system to enter a heightened security state (also referred to herein as a high alert state), for example, a higher security state relative to a prior security state. In this regard, the gateway device may cause a camera associated with the kitchen to scan an area associated with the front door to determine whether the front door is in a closed position. The gateway device may also cause a camera associated with the kitchen to scan a floor in front of the front door. The gateway device may cause a camera associated with the living room to scan a room for movement and/or track any determined movement. The gateway device may cause a microphone associated with the kitchen to increase sensitivity. The gateway device may cause a microphone associated with the living room to wake from a sleep state. The gateway device may cause an exterior camera (e.g., camera 236) associated with a front yard (e.g., yard 230) to track any detected movement in the front yard. The gateway device may cause an exterior camera (camera 234) associated with a driveway (e.g., driveway 232) to capture an image(s) and/or video(s) of the driveway.

The gateway device may receive data detected by the premises devices (e.g., camera(s) 216, light sensor(s) 220, acoustic device(s) 218, motion sensor(s) 222) of the premises management system. The gateway device may, for example, determine that the front door is in the closed position based on analyzing the received sensor data. The gateway device may determine that the first door sensor is on the floor and the front door is not on the floor. In an instance in which the user is at the premises when the premises management system is armed, the gateway device may determine that the user is behaving normally in the living room (e.g., the user is not behaving as one might expect if there was a break in, etc.). The gateway device may determine that the user is behaving normally based, in part, on the motion sensor(s) 222 not detecting any sharp or sudden movements and/or the acoustic device(s) 218 detecting no unusual sounds. The gateway device may determine there is no detected movement in the front yard of the premises. The gateway device may determine there is no detected vehicle and/or person in the driveway of the premises. The gateway device may compare the data received by the devices with historical data from the premises and determine that there is no unusual sound or movement detected for the premises for the time of day.

The gateway device may determine that the disruption to the first door sensor corresponds to a false alarm. The gateway device may cause an electronic notification/message to be sent to a user device of a user. The electronic notification/message may comprise a trouble state message associated with the door sensor and may include a notification of a false alarm.

FIG. 5 shows an example method. At operation 500, an apparatus, such as the gateway device 102/300, sensor device 310, or computing device 170, may begin a process of determining whether an alarm event is initiated. At operation 502, the apparatus may determine that a sensor device has not changed state. For example, the apparatus may determine that a contact sensor (e.g., contact sensor 322) of the sensor device has not changed state. For example, the apparatus may determine that the contact sensor remains closed.

At operation 504, the apparatus may determine that the sensor device has changed state. For example, the apparatus may determine that the contact sensor has changed to an open state. If no change in state is detected, then the method may return to operation 502. Thus, for example, the apparatus may loop through steps 502 and 504 until it detects a change in state of the sensor device.

If at operation 504 it is determined that a change in state has occurred, e.g., it is determined that the contact sensor has changed to an open state, control may proceed to operation 506. At operation 506, the apparatus may check or analyze a multi-axis sensor (e.g., multi-axis sensor 320) of the sensor device. The apparatus may check or analyze the multi-axis sensor by receiving data, such as one or more values, from the multi-axis sensor. The one or more values (e.g., accelerometer values, gyroscope values) may be associated with an accelerometer (e.g., accelerometer 317) and/or a gyroscope (e.g., gyroscope 319) of the sensor device.

At operation 508, the apparatus may compare accelerometer values to a predetermined threshold. The accelerometer values may comprise an X, a Y, and/or a Z component. The comparison may comprise comparing the X, Y, or Z component to the predetermined threshold. In an instance in which the apparatus determines that one of the component values, such as the Z component, exceeds the threshold value, the apparatus may determine that the movement of the sensor device is abnormal and that there is a false alarm event. Control may proceed to operation 514. In an instance in which the apparatus determines that none of the components exceeds the threshold value, the processor may determine that there is an alarm event associated with the sensor device 310 and proceed to operation 512. The alarm event may be indicative of a breach at an area associated with the sensor device 310, such as a door or window.

At operation 512, the apparatus may cause an alarm to be output (e.g., outputted sound), and a notification regarding the alarm may be provided to a control station (e.g., computing device 170) and/or a user device (e.g., a user device 190) of a user.

At operation 514, the apparatus may generate a notification (e.g., an electronic notification) of a false alarm and may send the notification of the false alarm to a user device of a user. The apparatus may cause a state of the sensor device to be set to a trouble state. The notification may include an indication that the sensor device is in the trouble state.

At operation 516, one or more other premises devices (e.g., camera(s) 216, light sensor(s) 220, acoustic device(s) 218, motion sensor(s) 222, or other sensors 130) may be caused to enter a heightened security state or level to focus on an area associated with the sensor device that is in the trouble state. The heightened security level may comprise a level of security higher than a prior level of security of the one or more premises devices. For example, one or more acoustic devices (e.g., acoustic device(s) 218) of the premises devices in an area associated with the sensor device may be caused to enter an active state to listen for sound or noise that may exceed a predetermined threshold. A sensitivity of the acoustic device(s) to noise detection may be increased. Alternatively, or in addition, the acoustic device(s) may be caused to listen for sounds indicating abnormal activity within the premises. The acoustic device(s) may be caused to enter the active state from a dormant state.

In addition or alternatively, one or more cameras (e.g., camera(s) 216) of the premises devices may be caused to reposition to focus on the area associated with the sensor device. Analysis of an image(s) and/or video(s) from the repositioned camera may be used to confirm the false alarm. For example, it may be determined from the image(s) and/or video(s) of a repositioned camera(s) that the sensor device is in its normal location and/or that the area monitored by the sensor device, such as a door or window, is not damaged. The image(s) and/or video(s) may also be monitored for other abnormal activity, such as abnormal movement of persons or objects within the premises.

Alternatively, or in addition, a camera outside, or external to, a structure associated with the sensor device, such as a door or window, may be adjusted to record movement in a yard (e.g., yard 230) or driveway (e.g., 232) associated with the structure and/or to detect and/or record movement of one or more entities (e.g., individuals) in the area.

Alternatively, or in addition, one or more motion sensor(s) 222 in the area associated with the sensor device may be caused to have increased sensitivity to detection of motion.

Figure 6:
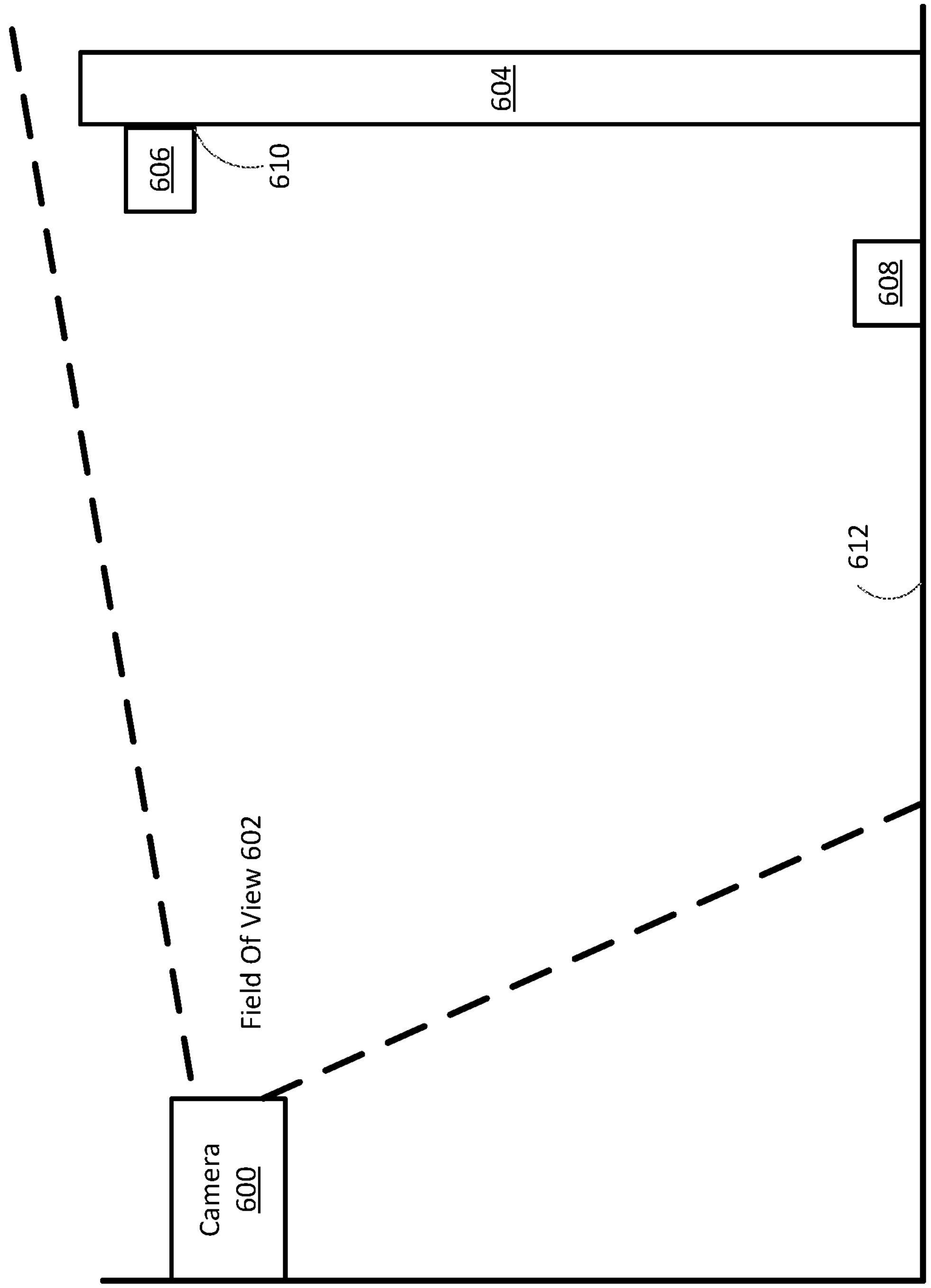
FIG. 6 shows an example premises management system.

FIG. 6 shows an example premises management system. The example premises management system may comprise a camera device 600 and a sensor device 606. The camera device 600 may comprise a camera such as, for example, the camera(s) 216 in FIG. 2. The sensor device may comprise a sensor device such as, for example, the sensor device 310 in FIG. 3 and/or the motion sensor(s) 222 in FIG. 2.

The camera device 600 may comprise a field of view 602. The field of view 602 may capture/record one or more images and/or video of a door 604. The sensor device 606 may initially be at a first location 610. The sensor device 606 may be secured to the door 604 or an area (e.g., a hinge, a wall, a window, a garage door, a ceiling, etc.) associated with the door 604) when the sensor is at the first location 610. The first location 606 may be in the field of view 602 of the camera device 600. In an instance in which the camera device 600 determines that a captured image(s) and/or video(s) shows the sensor device 606 is in the first location 606, the camera device may determine that the sensor device 606 is in a normal location, associated with the door 604, and is operating properly in a normal manner.

The field of view 602 of the camera device 600 may also capture/record one or more images and/or videos of an area of a floor 612 near the door 604. In this regard, the camera device 600 may determine an instance in which the sensor device 606 is at a second location 508. The sensor device 606 may be in the area of the floor 612 associated with the door 604 when the sensor device 606 is at the second location 608. The second location 608 may be an abnormal location of the sensor device 606. In an instance in which the camera device 600 determines that an image(s) and/or a video(s) captured by the camera 600 shows the sensor device 606 in the second location 608 (e.g., the abnormal location), the camera device 600 may determine that the sensor device 606 fell from the first location 606 and is not operating properly and is in a trouble state.

FIG. 7 shows an example method. At operation 700, an apparatus, such as the gateway device 102/300, sensor device 310, or computing device 170, may begin a process of determining whether an alarm event is initiated. At operation 702, the apparatus may determine that a sensor device has not changed state. For example, the apparatus may determine that a contact sensor (e.g., contact sensor 322) of the sensor device has not changed state. For example, the apparatus may determine that the contact sensor remains closed.

At operation 704, the apparatus may determine that the sensor device has changed state. For example, the apparatus may determine that the contact sensor has changed to an open state. If no change in state is detected, then the method may return to operation 702. Thus, for example, the apparatus may loop through steps 702 and 704 until it detects a change in state of the sensor device.

If at operation 704 the apparatus determines that the contact sensor has changed to an open state, control may proceed to operation 706. At operation 706, the apparatus may determine whether a camera is present (e.g., in a structure (e.g., home, office, etc.) associated with the door 604).

In an instance in which the apparatus determines that a camera is not present, the apparatus may, at operation 708, output an alarm (e.g., a sound) and may send an alarm notification (e.g., an electronic alarm notification) to a control station and/or a user device (e.g., a user device 190) of a user, notifying of the alarm event (e.g., a security breach at a premises associated with sensor device 310). In an instance in which a camera is present, then the method may proceed to operation 710.

At operation 710, the apparatus may determine a location of the sensor device. The apparatus may determine the location of the sensor device based on an analysis of an image(s) and/or video(s) captured by the camera.

At operation 712, the apparatus may determine whether the determined location of the sensor device is normal. The determination of operation 712 may comprise comparing the determined location of the sensor device detected by the camera, in a captured image(s) and/or video(s), with one or more predetermined normal locations (e.g., first location 610). In an instance in which the apparatus determines that the location of the sensor device, captured by the camera is a normal location, the apparatus may determine an alarm event has occurred and control may proceed to operation 708. At operation 708, the apparatus may output an alarm (e.g., a sound) and may send an alarm notification (e.g., an electronic alarm notification) to a control station and/or a user device, notifying of the alarm event (e.g., a security breach at a premises associated with sensor device 310).

If the apparatus determines that the determined location of the sensor device, captured by the camera, is an abnormal location (e.g., second location 608), the apparatus may determine that the sensor device is in a trouble state or has otherwise malfunctioned. For example, the apparatus may determine that a door sensor is located on an area of a floor in front of the door instead of its normal position on the door. Based on determining that the door sensor is in this abnormal location, the apparatus may determine that the door sensor has malfunctioned, e.g., by falling from its mount on the door. Based on determining from the captured image(s) and/or video(s) of the camera that the sensor device has malfunctioned, control may proceed to operation 716.

At operation 716, the apparatus may generate a notification (e.g., an electronic notification) of a false alarm event and may send the notification of the false alarm event to a user device of a user.

The determination that a false alarm occurred or did not occur may be based on a combination of data from a multi-axis sensor of a sensor device and a camera. For example, in the method of FIG. 5, upon determining in operation 508 that abnormal movement of a sensor device has occurred, the camera described in connection with FIGS. 6 and 7 (e.g., camera 600) may be used to further confirm that the sensor device has moved to an abnormal location. For example, if data from the multi-axis sensor indicates that a door sensor has moved vertically in a downward direction, the data from the camera may be used to confirm that the door sensor is now located on the floor in front of the door—and has thus malfunctioned by falling from its normal mount on the door. As further described above, other sensors or monitoring devices, including microphones, motion detectors, light sensors, and other cameras may be placed in a heightened security state or level and may be used to further confirm whether a false alarm has or has not occurred.

Figure 8:
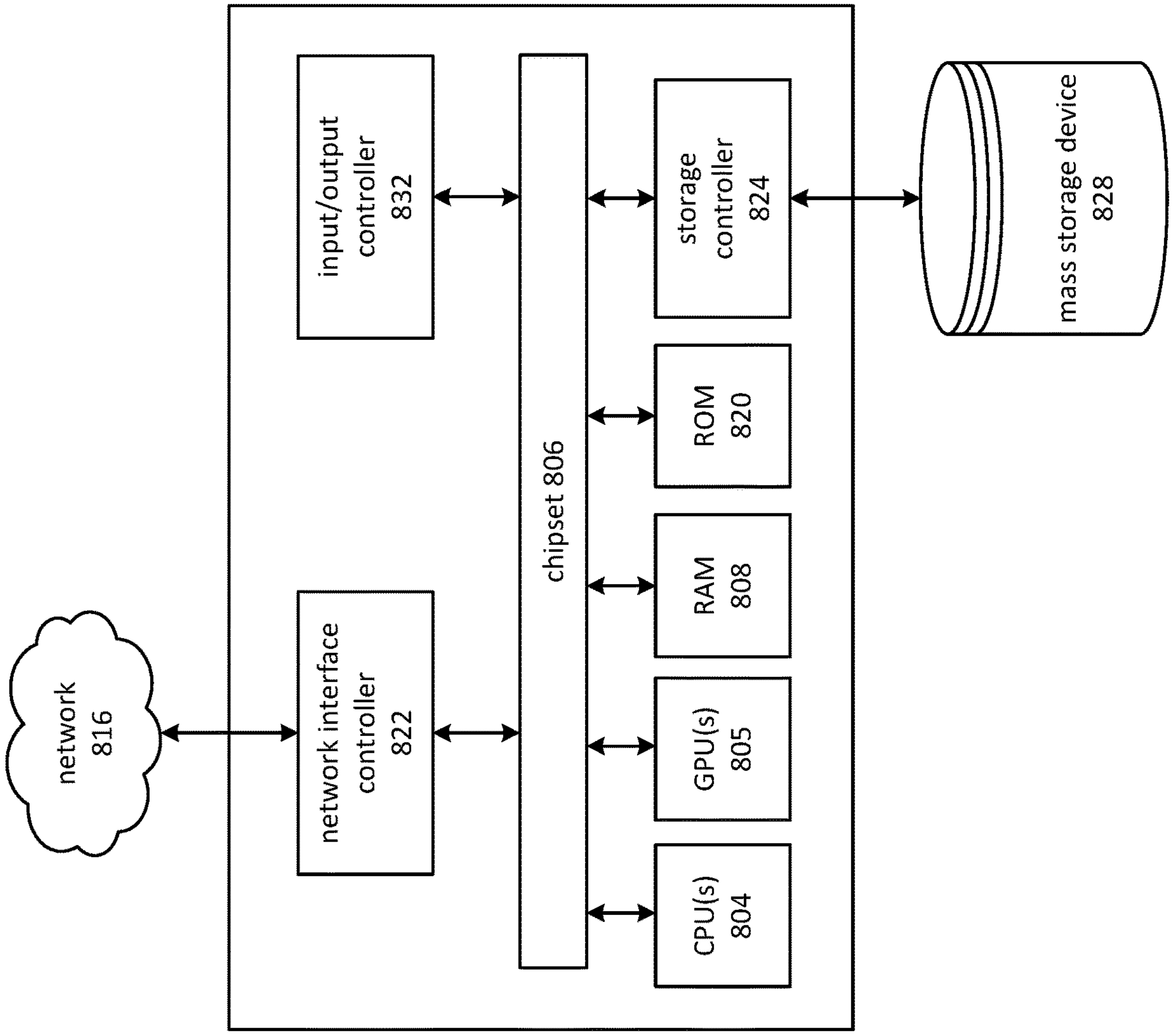
FIG. 8 shows an example computing device.

FIG. 8 depicts a computing device in which one or more of the apparatus described above may be embodied, such as the various apparatus illustrated in FIGS. 1, 2, 3, and 6. For example, with regard to the example systems of FIGS. 1, 2, and 3, any of the user devices 190, the computing device 170, any of the modules 162, 164, 166, 168 of the operator domain 160, the home computer 127, the gateway devices 120, 130, and the sensor device 310 may each be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing device or apparatus, and may be utilized to execute any aspects of the methods described herein, such as to implement the methods described in relation to FIGS. 4, 5, and 7.

The computing device 800 may include a baseboard, or "motherboard," which is a printed circuit board to which a multitude of components or devices may be connected by way of a system bus or other electrical communication paths. One or more processors, such as central processing units (CPUs) 804, may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to generate more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to memory, such as a random access memory (RAM) 808 used as the main memory in the computing device 800. The chipset 806 may provide an interface to a computer-readable storage medium, such as a read-only memory (ROM) 820 or non-volatile RAM (NVRAM) (not shown), for storing computer-executable instructions that when executed perform basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing devices, servers, nodes, sensors, apparatus, and systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing devices over the network 816. It should be appreciated that multiple NICs 822 may be present in the computing device 800, connecting the computing device to other types of networks and remote computing devices or systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as computer-executable instructions, program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, non-transitory computer-readable storage media, and removable and non-removable media implemented in any method or technology. As used herein, computer-readable storage media does not include transitory media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by indicating how the CPU(s) 804 transition between states, as described herein. The computing device 800 may have access to computer-readable storage media storing computer-executable instructions, which, when executed by the computing device 800, cause performance of the methods described in relation to FIGS. 4, 5, and 7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and apparatus described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Example" means "an example of" and is not intended to convey an indication of a preferred or ideal embodiment. "Such as" is not used in a restrictive sense, but for explanatory purposes.

Components are described that may be used to perform the described methods and apparatus. When combinations, subsets, interactions, groups, etc., of these components are described, it is understood that while specific references to each of the various individual and collective combinations and permutations of these may not be explicitly described, each is specifically contemplated and described herein, for all methods and apparatus. This applies to all aspects of this application including, but not limited to, operations in described methods. Thus, if there are a variety of additional operations that may be performed it is understood that each of these additional operations may be performed with any specific embodiment or combination of embodiments of the described methods.

The methods and apparatus may take the form of an entirely hardware embodiment, an entirely software embodiment, or an embodiment combining software and hardware aspects. Furthermore, the methods and apparatus may take the form of a computer program product on a computer-readable storage medium having computer-readable program instructions (e.g., computer software) embodied in the storage medium. More particularly, the present methods and apparatus may take the form of web-implemented computer software. Any suitable computer-readable storage medium may be utilized including hard disks, CD-ROMs, optical storage devices, or magnetic storage devices.

Embodiments of the methods and apparatus are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer-executable instructions. These computer-executable instructions may be loaded on a general-purpose computer, special-purpose computer, or other programmable data processing apparatus to produce a machine, such that the instructions which execute on the computer or other programmable data processing apparatus generate a means for implementing the functions specified in the flowchart block or blocks.

These computer-executable instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer-executable instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as example only, with a true scope and spirit being indicated by the following claims.

The invention claimed is:

1. A method comprising:

receiving data indicative of movement of a sensor device configured to be mounted in a premises, wherein the data comprises at least a direction of movement of the sensor device;

determining, based on the data comprising the direction of movement, whether the movement of the sensor device is abnormal or normal; and causing, based on determining that the movement of the sensor device is abnormal, output of an alarm indicative of a false alarm.

2. The method recited in claim 1, wherein determining whether the movement of the sensor device is abnormal or normal comprises comparing the received data to data indicative of normal movement of the sensor device.

3. The method recited in claim 2, wherein the data indicative of normal movement of the sensor device comprises one or more of data indicative of historical movement of the sensor device, data stored as part of a calibration of the sensor device, data input by a user of the sensor device, or preprogrammed data associated with the sensor device.

4. The method recited in claim 1, wherein the data indicative of movement of the sensor device comprises one of data of an accelerometer of the sensor device or data of a gyroscope of the sensor device.

5. The method recited in claim 4, wherein determining, based on the data, whether the movement of the sensor device is abnormal or normal comprises one of determining whether a speed of movement or acceleration of the sensor device exceeds a threshold value or determining whether the sensor device has moved in a direction that is abnormal.

6. The method recited in claim 1, wherein the data indicative of movement of the sensor device comprises one of an image or video captured by a camera associated with the sensor device, and wherein determining whether the movement of the sensor device is abnormal or normal comprises determining, based on the image or video, that a location of the sensor device has changed.

7. The method recited in claim 1, further comprising:

causing, based on determining that the movement of the sensor device is abnormal or normal, one or more other sensor or monitoring devices to enter a heightened security state or level.

8. The method recited in claim 7, wherein causing one or more other sensor or monitoring devices to enter a heightened security state or level comprises increasing a sensitivity of another sensor device or monitoring device located in a vicinity of the sensor device.

9. A computer-readable medium storing instructions that, when executed, cause:

receiving data indicative of movement of a sensor device configured to be mounted in a premises, wherein the data comprises at least a direction of movement of the sensor device;

determining, based on the data comprising the direction of movement, whether the movement of the sensor device is abnormal or normal; and causing, based on determining that the movement of the sensor device is abnormal, output of an alarm indicative of a false alarm.

10. The computer-readable medium of claim 9, wherein the instructions that, when executed, cause determining whether the movement of the sensor device is abnormal or normal, cause comparing the received data to data indicative of normal movement of the sensor device.

11. The computer-readable medium of claim 10, wherein the data indicative of normal movement of the sensor device comprises one or more of data indicative of historical movement of the sensor device, data stored as part of a calibration of the sensor device, data input by a user of the sensor device, or preprogrammed data associated with the sensor device.

12. The computer-readable medium of claim 9, wherein the data indicative of movement of the sensor device comprises one of data of an accelerometer of the sensor device or data of a gyroscope of the sensor device.

13. The computer-readable medium of claim 12, wherein the instructions that, when executed, cause determining whether the movement of the sensor device is abnormal or normal, cause one of:

determining whether a speed of movement or acceleration of the sensor device exceeds a threshold value; or determining whether the sensor device has moved in a direction that is abnormal.

14. The computer-readable medium of claim 9, wherein the data indicative of movement of the sensor device comprises one of an image or video captured by a camera associated with the sensor device, and wherein the instructions that, when executed, cause determining whether the movement of the sensor device is abnormal or normal, cause determining, based on the image or video, that a location of the sensor device has changed.

15. The computer-readable medium of claim 9, wherein the instructions, when executed, further cause:

causing, based on determining that the movement of the sensor device is abnormal or normal, one or more other sensor or monitoring devices to enter a heightened security state or level.

16. The computer-readable medium of claim 15, wherein the instructions that, when executed, cause causing one or more other sensor or monitoring devices to enter a heightened security state or level, cause increasing a sensitivity of another sensor device or monitoring device located in a vicinity of the sensor device.

17. An apparatus comprising:

one or more processors; and memory storing computer executable instructions that, when executed, cause:

receiving data indicative of movement of a sensor device configured to be mounted in a premises, wherein the data comprises at least a direction of movement of the sensor device;

determining, based on the data comprising the direction of movement, whether the movement of the sensor device is abnormal or normal; and causing, based on determining that the movement of the sensor device is abnormal, output of an alarm indicative of a false alarm.

18. The apparatus recited in claim 17, wherein the instructions that, when executed, cause determining whether the movement of the sensor device is abnormal or normal, cause comparing the received data to data indicative of normal movement of the sensor device.

19. The apparatus recited in claim 18, wherein the data indicative of normal movement of the sensor device comprises one or more of data indicative of historical movement of the sensor device, data stored as part of a calibration of the sensor device, data input by a user of the sensor device, or preprogrammed data associated with the sensor device.

20. The apparatus recited in claim 17, wherein the data indicative of movement of the sensor device comprises one of data of an accelerometer of the sensor device or data of a gyroscope of the sensor device.

* * * * *